S. MAYER.
Apparatus for Cutting Goods Bias.
No. 162,841. Patented May 4, 1875.
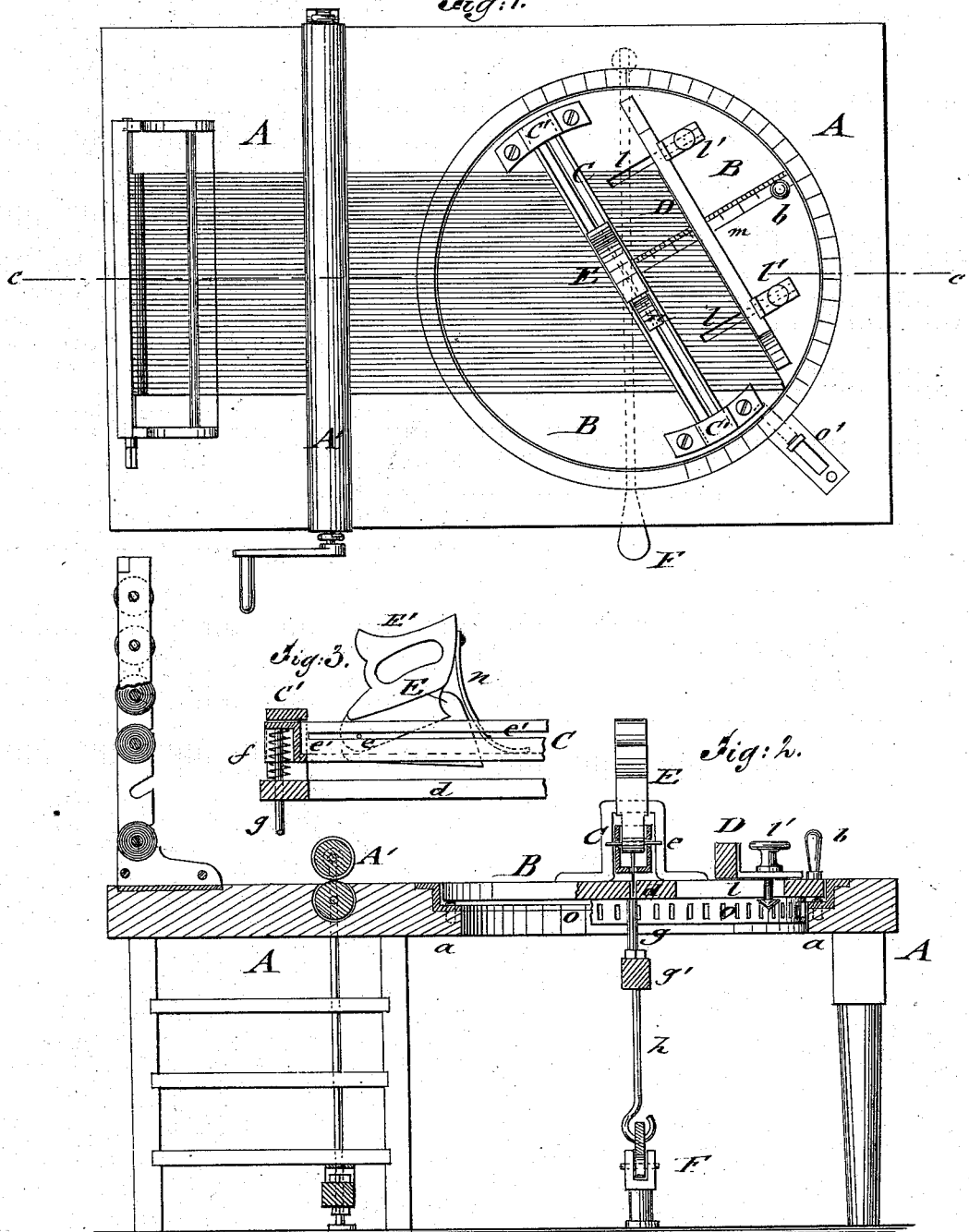
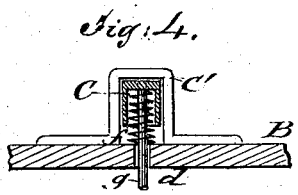

UNITED STATES PATENT OFFICE.

SALOMON MAYER, OF NEW YORK, N. Y.

IMPROVEMENT IN APPARATUS FOR CUTTING GOODS BIAS.

Specification forming part of Letters Patent No. 162,841, dated May 4, 1875; application filed April 17, 1875.

*To all whom it may concern:*

Be it known that I, SALOMON MAYER, of the city, county, and State of New York, have invented a new and Improved Apparatus for Cutting Goods on Bias, of which the following is a specification:

In the accompanying drawing, Figure 1 represents a top view of my improved apparatus for cutting goods on bias; Fig. 2, a vertical longitudinal section of the same, on the line *c c*, Fig. 1; and Figs. 3 and 4 are, respectively, side view and section of the knife and knife-grinding clamp-piece.

Similar letters of reference indicate corresponding parts.

My invention relates to an apparatus by which goods of any thickness or number of layers may be cut to any required bias, angle, and width of strips in quick, reliable, and convenient manner, so as to simplify and accelerate thereby the cutting on bias for manufacturing purposes.

My invention consists of a feed-table with a revolving disk, having central bias-slot and a treadle-acted and knife-grinding clamp-piece applied thereto, which, in connection with an adjustable gage-piece, is set with the disk-plate to any angle, and locked in the required position for cutting the width and angle of the bias strips.

In the drawing, A represents a table of suitable size, on which the fabrics to be cut on bias are spread to be fed forward to the gaging and cutting devices by a suitable feed-roller mechanism, A'. The goods are wound up, in three or more layers, on detachable rollers, placed on a rack at the end of the table, to be then passed in any number of layers through the feeding mechanism. A revolving disk-plate, B, turns on friction-rollers, or otherwise, on an annular shoulder, *a*, of the table, and may, by being taken hold of by a handle, *b*, be carried into any position on the table. A diametrical slot, *d*, of the disk-plate guides the cutting-knife E, which runs, by a cross-pawl, in longitudinal side slots, *e'*, of the U-shaped clamp-piece C. Supporting-guides C' are attached to the disk-plate at each end of the central guide-slot for securing the clamp-piece C therein, so that its central bottom slot is always retained exactly above and in line with the central guide-slot of the disk. The clamp-piece C is forced in upward direction against its guide-bands C' by spiral springs *f*, and carried down on the disk, to clamp the goods adjusted therein for cutting, by end-rods *g*, that are attached to a lateral connecting-piece, *g'*, which is again applied by a central swivel-rod *h*, to the operating-treadle F, below the disk, so that the same may be turned freely and the treadle brought into instant use at any position of the disk. A gage-piece, D, is arranged parallel to the central guide-slot *d* on the disk, and adjusted thereon to any distance from the same by guide-slots *l* and clamp-screws *l'*. The width of the bias strips is defined by the position of the gage-piece, which may be set to any width by a graduated scale, *m*, of the disk. The edge of the goods is brought against the gage-piece, after the same has been set to the required width of the strips. The clamping-piece is then carried down by the treadle, and the knife passed through the goods, cutting all the layers at the same time in even and perfect manner. The knife E is pivoted by cross-pin *e* to the clamp-piece, made of triangular shape, and set into a handle, E', to the rear part of which a band-spring, *n*, is attached. When the knife is used the handle is depressed, so that the rear end of the knife enters first into the fabric, and the knife assumes throughout its cutting motion a downward inclined position, and furnishes an even and regular cut. The band-spring *n* rests on the bottom part of the clamp-piece, and throws instantly, on the release of the handle, the knife on the pivot-pin in upward direction to a position within the clamp-piece. In larger machines, for heavier goods, the knife may be arranged to be worked by steam or other power. After the strips are cut off the treadle is released, the clamp-piece is thrown up by the springs, and the goods are fed forward to be adjusted for the next cutting. The under side of disk B is provided with a grooved or slotted flange or rim, *o*, into which a sliding bolt or latch, *o'*, locks for securing the disk at any point. The table may be graduated along the circumference of the disk for the purpose of setting off any desired bias angle. The goods may also be cut off square by placing the central slot of the disk at right angles to the longitudinal axis of the table. As the clamp and gage-pieces are attached permanently to the revolving disk, no detachable parts are required, and the cutting, clamping, and gaging devices carried directly with the disk into the required position for cutting off bias strips of any angle, width, and thickness of goods with great facility, rapidity, and economy.

Having thus described my invention, I claim as new and desire to secure by Letters Patent—

1. An apparatus for cutting goods bias, composed of a supporting-table, with centrally-slotted revolving disk-plate, provided with a slotted knife-guiding and treadle-acted clamp-piece, and parallel adjustable gage-piece, all arranged and operated substantially as and for the purpose set forth.

2. The slotted and spring-acted clamp-piece, having bottom slot in line with central guide-slot of disk and longitudinal side guide-slots, in combination with pivoted and spring-cushioned cutting-knife, guided therein substantially as specified.

3. In an apparatus for cutting goods bias, the combination of the revolving disk-plate, having grooved or recessed circumferential bottom flange, with the sliding lock-bolt of the table, for setting disk to any cutting angle, substantially as set forth.

SALOMON MAYER.

Witnesses:
PAUL GOEPEL,
T. B. MOSHER.